Patented July 25, 1950

2,516,370

UNITED STATES PATENT OFFICE 2,516,370

SEPARATION OF GAMMA AND BETA-PICOLINES

Louis J. Cracas, Oradell, N. J., assignor to The Upjohn Company, Kalamazoo, Mich., a corporation of Michigan No Drawing. Application May 2, 1946, Serial No. 666,848

7 Claims. (Cl. 260—290)

This invention relates to a method for separating beta and gamma-picolines (3 and 4-methylpyridines) from a mixture thereof free of lutidine.

The preparation of pure beta-picoline has become of increasing importance due to its use as a starting material for the preparation of nicotinic acid and other important substances. Gamma-picoline is likewise finding increasing use in the preparation of certain desirable plasticizers. Although beta and gamma-picolines are available in considerable quantity mixed with one another and with one or more of the lutidines in the so-called "light oil" fraction obtained in the working up of coal tar, the separation of the picolines from the lutidines and from each other has presented a serious problem. Numerous methods for accomplishing such separations have been proposed and some of them have been employed commercially, but each of them has left much to be desired from the point of view of economy, ease of operation and efficiency in recovery of the beta and gamma-picolines. It has been difficult to operate these processes so as to obtain beta and gamma-picolines having the degree of purity required for the economical preparation of nicotinic acid on the one hand and of certain valuable plasticizers on the other hand.

In a co-pending abandoned application, Serial No. 637,038, filed jointly December 22, 1945, by the present applicant and Frederic C. Rudolph, there is described a method for separating by means of zinc chloride a highly purified mixture of beta and gamma-picolines from light oil. The mixture of picolines so obtained consists of approximately equal parts of beta and gamma-picolines. A typical analysis of such a mixture showed it to contain 46 per cent by weight of beta-picoline and 54 per cent of gamma-picoline. The specific gravity of the mixture was 0.96. An example of such method of effecting this purification is described in greater detail hereinafter.

It has now been found and is herein first disclosed that pure gamma-picoline can be separated from a mixture of beta and gamma-picolines, such as that prepared by the method of the co-pending application, by reacting the mixture with phthalic acid in a polar organic liquid, such as methanol, ethanol, pentanol, acetone, methyl ethyl ketone, and ethyl acetate. Acetone is the preferred polar organic liquid because of its advantageous boiling point and its solubilizing characteristics for the picoline phthalates, and the invention will be described with particular reference thereto. Phthalic acid reacts with both beta and gamma-picolines to form phthalates. Gamma-picoline phthalate is much less soluble in cold acetone than is beta-picoline phthalate and crystallizes out in substantially pure form when a warm concentrated acetone solution of the two phthalates is cooled, the beta-picoline phthalate remaining in solution. The crystals may be separated from the mixture by filtering and pure gamma-picoline recovered from them, e. g., by treating them with an alkali, such as concentrated aqueous sodium hydroxide, separating the layer of gamma-picoline which forms, and subsequently drying it by distillation over solid sodium hydroxide. In this way a substantial proportion of the gamma-picoline in the original mixture of beta and gamma-picolines may be recovered easily and in highly purified form.

The acetone mother liquor obtained from the filtering and washing of the crystals of gamma-picoline phthalate may be treated for acetone recovery in any suitable manner and the remaining portion of the filtrate treated with an excess of alkali and a mixture of picolines rich in beta-picoline recovered.

The aqueous layer remaining after the separation of the gamma-picoline and that remaining after the separation of the beta-rich picoline mixture may be combined and treated for phthalic acid recovery in any suitable manner, e. g., by acidifying, filtering and drying, and the recovered phthalic acid recycled in the process.

The beta-rich mixture of picolines, which usually contains from 60 to 80 per cent by weight of beta-picoline, can be treated effectively for the recovery therefrom of pure beta-picoline. Such recovery of pure beta-picoline is carried out by treating the beta-rich mixture with a concentrated aqueous solution of zinc sulfate. Zinc sulfate reacts with both beta and gamma-picolines to form complex compounds which are very soluble in hot water. The beta-picoline complex compound is much less soluble in water at low temperatures, however, than is the gamma-picoline complex compound and separates readily and in almost pure form when a hot concentrated solution of the two is cooled, the gamma-picoline complex compound remaining in solution. The crystals may be separated from the mixture by filtering and pure beta-picoline recovered from the crystals by treating them with an excess of strong aqueous alkali, separating the oily layer of beta-picoline which forms and subsequently drying it by distillation over solid sodium hydroxide.

The filtrate from the separation of the beta-picoline zinc sulfate complex compound may be treated with an excess of alkali and a mixture of picolines obtained containing from about 50 to about 70 per cent by weight of gamma-picoline. This picoline mixture can be dried by distillation over solid sodium hydroxide and recycled to the phthalic acid treating step for the recovery of an additional quantity of gamma-picoline. By such recycling of the unseparated beta and gamma-picolines, losses of picolines in the process are reduced to a minimum and substantially complete separation and recovery of beta and gamma-picolines contained in a mixture thereof can be obtained.

In carrying out the process of the invention it is generally advisable to use about one mol of phthalic acid for each mol of picolines in the mixture of beta and gamma-picolines. It is thought that during the reaction a picoline salt of phthalic acid is formed. The preparation of an acetone solution of picoline phthalates and crystallization of the gamma salt from the mixture can be carried out readily using approximately as much acetone, by weight, as of the picoline mixture, although the actual amount of acetone used will depend to some extent upon the proportion of gamma-picoline in the mixture. Sufficient acetone should be used to provide a thick slurry when the acetone solution of picoline phthalates is cooled. Use of too much acetone will cause poor separation of gamma-picoline phthalate. The mixture is cooled to about 20° C. or lower and filtered.

When pure beta-picoline is to be recovered from the filtrate from the gamma-picoline phthalate, acetone is removed by vaporization and the residue treated with sufficient strong alkali to render it strongly alkaline; the beta-rich layer of picolines which forms is separated and the layer distilled over solid sodium hydroxide to dry it.

In treating this beta-rich picoline mixture with zinc sulfate to recover pure beta-picoline, it is advisable to use from about 0.78 to about 0.92 part by weight zinc sulfate (calculated as ZnSO$_4$) for each part of mixture of beta and gamma-picolines.

Although the exact composition of the complex compounds formed by beta and gamma-picolines with zinc sulfate has not been determined, it has been found that the separation of the two in the manner described can be carried out readily using about two mols of mixed picolines for each mol of zinc sulfate. Sufficient water should be included in the reaction mixture to dissolve substantially all of the complex compounds of beta and gamma-picolines at an elevated temperature, but care should be taken that the solution is not too dilute or difficulty may be experienced during the crystallization step and recovery of the beta-picoline complex compound will be low. Sufficient water should be used so that the solution of complex compounds will, upon cooling, not set to a hard cake and thus be difficult to handle. It has been found that best results are obtained when from about 1.0 to about 1.50 parts by weight of water are used for each part of mixture of beta and gamma-picolines, although this will depend to some extent on the proportion of beta-picoline in the mixture. The mixture is cooled to about 20° C. or lower and filtered.

It should be mentioned also that, although the above description relates to the separation of gamma-picoline from its phthalate and beta-picoline from its complex zinc sulfate compound by decomposing these respective products with alkali, other means for liberating the picolines from these products may also be employed. For example, gamma-picoline phthalate may be decomposed by heating and the gamma-picoline distilled leaving a mixture of phthalic acid containing some phthalic anhydride which may be recycled in the process after converting the anhydride to acid. In like manner the complex compound of beta-picoline and zinc sulfate can be heated and the beta-picoline volatilized leaving zinc sulfate as a residue. Volatilization of the picoline is substantially complete in each case at from about 150° to about 175° C. or even lower. This procedure has certain advantages, in that it permits direct recovery of phthalic acid and zinc sulfate in forms suitable for recycling in the process.

The process of the invention, wherein the mixture is treated first with a solution of phthalic acid in a polar organic liquid to separate gamma-picoline, is particularly applicable to mixtures containing at least about 30 per cent by weight of gamma-picoline. When mixtures are used containing less than about 30 per cent of gamma-picoline, it is frequently desirable to remove a portion of the beta-picoline from the mixture by treating it first with zinc sulfate in accordance with the previously described procedure prior to forming the picoline phthalates. In this way, the proportion of gamma-picoline in the recovered mixed picolines is increased over that in the original mixture and the recovered portion may then be treated with phthalic acid in the manner herein described. Such procedure is described more fully in Examples 2A and 2B and the description hereinafter and in my concurrently filed application, Serial No. 666,849, which has been abandoned. Such procedure is especially applicable to picoline mixtures that are rich in beta-picoline.

Certain advantages of the invention are apparent from the following examples which are given by way of illustration only and are not to be construed as limiting.

*Preparation of a lutidine-free mixture of picolines*

One hundred milliliters (93.8 grams) of a light fraction of coal tar oil, consisting essentially of a mixture of 35 percent of 2,6-lutidine (2,6-dimethylpyridine), 29.5 percent of beta-picoline (3-methylpyridine), 30.5 percent of gamma-picoline (4-methylpyridine), 4.0 percent of other oils and 1.0 percent water, was placed in a beaker and 153.6 milliliters of aqueous zinc chloride solution containing 75.26 grams of zinc chloride was added thereto. This corresponds to approximately 17 percent excess of zinc chloride, which was added to insure the complete formation of complex salts and prevent the loss of uncombined base by evaporation during subsequent vacuum filtration and boiling. The heat of reaction caused the temperature of the aqueous medium to rise to approximately 54° C.

After the aqueous medium had cooled to approximately 40° C., the mixture was diluted with 100 millimeters of water, with stirring. A voluminous white precipitate formed and the mixture became viscous and separated into two layers, an upper layer of fine white crystals and a lower layer consisting of a colorless gelatinous mass. On cooling to 33° C., the lower mass disappeared and the entire precipitate became crystalline at 30° C. Uniform stirring was continued until a temperature of 26° C. was reached, at which temperature the product was transferred to the basket of a semi-micro centrifuge having a maximum speed of 8000 revolutions per minute. In this procedure, continuous stirring is essential since proper crystallization is an important factor.

The mixture in the centrifuge basket was centrifuged and the cake transferred to a beaker in order to wash the crystals. Approximately 100 milliliters of water was added to the beaker and the contents thereof were heated to approximately 90° C. The mixture was again diluted with an equal volume of water and allowed to cool slowly with continuous stirring. Constant stirring during this cooling period is a definite factor in the efficient extraction of the lutidine. After the mixture had cooled to 27° C., it was again transferred to the basket and centrifuged. This process of centrifuging, washing and heating was repeated two more times, the volume of the cake decreasing each time as more of the lutidine was removed.

The final washed cake was transferred to a beaker, 50 milliliters of 25 percent aqueous sodium hydroxide solution was added and the cake dissolved completely therein. On standing, the solution separated into two immiscible liquid layers, which were separated from each other. Sixty milliliters of free base was thus collected and rectified over solid sodium hydroxide to yield a pure mixture of beta and gamma-picolines. The lutidine was contained in the oil recovered from the filtrate liquor, and amounted to 38.4 milliliters of free lutidine.

The mixture of beta and gamma-picolines obtained in this manner was tested for the presence of lutidine by oxidation to carboxylic acids. On treatment with ferrous sulfate, no color developed. The mixed picolines were analyzed by determining the arrest point of their salicylic acid addition compounds, which occurs at the change of state from liquid to solid. This arrest point, when compared with a standard curve plotted from the arrest points of known mixtures of beta and gamma-picolines, showed 49.0 percent of beta and 51 percent of gamma-picolines. Thus, the 60 milliliters of recovered picoline was composed of 29.4 milliliters of beta and 30.6 milliliters of the gamma isomer.

The oil recovered from the filtrate liquor (38.4 milliliters) was then analyzed for lutidine. The oil was oxidized to the alpha-carboxylic acid and the color developed therefrom with ferrous sulfate was compared with various standards containing known amounts. Such method of estimation is accurate to as little as 0.1 percent of lutidine and this sample assayed 90.1 percent lutidine. The amount of lutidine recovered in this fraction was thus 90.1 percent of 38.4 milliliters, or a total of 34.6 milliliters of lutidine.

Accordingly, the recovery of the bases from the fraction of coal tar oil in accordance with the foregoing method was practically quantitative.

Although the temperature at which the separation was effected in this procedure was 26° C., the temperature may be varied at this step of the process between approximately 24° and approximately 30° C., at which temperature the lutidine-zinc chloride complex is soluble in water whereas the picoline complexes form a granular, highly insoluble mass which can be separated by filtration. In certain instances, for example, when the proportion of lutidine in the starting material is low, the temperature may be maintained as high as 40° C. or even somewhat higher. Furthermore, when the proportion of lutidine in the starting material is high, between approximately 40 percent and approximately 60 percent, it is desirable to carry out the process at a somewhat lower temperature, for example, at approximately 18° C. The control of temperature is a critical factor for the successful separation of these compounds, although other factors, such as uniform stirring to obtain proper crystallization of the picoline addition compounds, and to avoid occlusion of lutidine compounds, are also important in obtaining high yields.

The addition compounds formed by the reaction of zinc chloride with 2,6-lutidine and beta and gamma-picolines have the general formula: $ZnCl_2.2M$, in which M represents one of these amines. Specifically, the addition compound formed from zinc chloride and lutidine is $$ZnCl_2.2(CH_3)_2C_5H_3N$$

and the addition compound formed from zinc chloride and both beta and gamma-picolines is $ZnCl_2.2CH_3C_5H_4N$.

Although the separation of the complex compounds of beta and gamma-picolines from that of lutidine was effected by centrifugation, this separation may be effected prior to crystallization by filtration, decantation or by other conventional methods, since the zinc chloride complexes separate into two distinct liquid layers having different specific gravities.

While the ratios of the crude picoline-lutidine mixture to zinc chloride to water are illustrated in this procedure as approximately 1:1:1, the process may be conducted with ratios deviating therefrom by approximately 20 percent or slightly more.

*Example 1A*

One part by weight of a mixture of beta and gamma-picolines consisting of 46 per cent by weight of beta-picoline and 54 per cent gamma-picoline is treated with 1.74 parts phthalic acid in 0.95 part acetone. The mixture is warmed gently until a homogeneous solution is obtained and then cooled slowly with stirring to about 20° C. The slurry which results is centrifuged and the cake washed with acetone. The filtrate and washings are set aside for acetone recovery and further treatment. The crystals of gamma-picoline phthalate are mixed with a little water and the mixture made alkaline with flake sodium hydroxide. The supernatant layer of gamma-picoline which forms is separated and distilled over solid sodium hydroxide. There is thus obtained 0.275 part by weight of gamma-picoline of 95 per cent purity representing a yield of 51 per cent of the gamma-picoline in the original mixture.

The filtrate and washings from the crystals of gamma-picoline phthalate are treated for acetone recovery by distillation. The residue is dissolved in a small amount of water, then made strongly alkaline with solid sodium hydroxide. The supernatant layer of mixed picolines which forms is separated and distilled over solid sodium hydroxide. The fraction of beta-rich mixed picolines thus obtained amounts to 0.655 part by weight of the original mixture and consists of 0.43 part beta-picoline and 0.235 part gamma-picoline or 66 per cent beta and 36 per cent gamma. This beta-rich fraction is saved for treatment as in Example 1B.

The aqueous layer from the gamma-picoline separation and that from the separation of the picoline mixture just described are combined and treated for phthalic acid recovery in any suitable manner, for example by diluting, acidifying and filtering. The precipitated phthalic acid recovered may be re-used in the above process.

Example 1B

One part by weight of a beta-rich mixture consisting of 65 per cent by weight of beta-picoline and 35 per cent gamma-picoline recovered as in Example 1A is added slowly to a hot solution of 0.83 part by weight zinc sulfate (containing 10 per cent water) in 1.25 parts water. Substantially all of the picoline mixture dissolves and a heavy solution is formed. This solution is cooled slowly with stirring to about 20° C. Crystals begin to separate at from 40° to 50° C. and at 20° C. the mixture is a thick slurry. The mixture is filtered in a centrifuge and the cake washed with a small amount of cold water. This filter cake is a crystalline complex compound of beta-picoline and zinc sulfate. The filtrate is set aside for further treatment. The filter cake is mixed with about one-half its weight of water, made strongly alkaline with flake sodium hydroxide and the supernatant layer of beta-picoline which forms is separated and distilled over solid sodium hydroxide. There is thus obtained 0.39 part of beta-picoline of 94 per cent purity or 59 per cent of the beta-picoline in the original beta-rich mixture.

The filtrate from the beta-picoline-zinc sulfate complex compound is made strongly alkaline by addition of solid sodium hydroxide. The picoline mixture which separates is distilled over solid sodium hydroxide and consists of a mixture of 0.23 part beta and 0.32 part gamma-picoline or 42 per cent beta-picoline and 58 per cent gamma-picoline. The mixture of recovered picolines is recycled according to the method of Example 1A for recovery of gamma-picoline.

Example 2A

One part by weight of a mixture of beta and gamma-picolines containing 46 percent by weight of beta-picoline and 54 percent gamma-picoline (the same mixture used in Example 1A) is added slowly to a hot solution of 0.850 part of zinc sulfate (containing 10 percent moisture) in 0.952 part of water. Substantially all of the picolines dissolve and there is formed a heavy somewhat opalescent solution. The solution is cooled slowly and with stirring to about 20° C. Crystals begin to separate at between 40° and 50° C. and the cooled mixture is a thick slurry. The mixture is filtered in a centrifuge and the cake is washed as well as possible in the centrifuge with a small amount of cold water, and is then removed. There is thus obtained 0.679 part by weight of a crystalline complex compound of beta-picoline and zinc sulfate. The filtrate is saved for further processing to recover a gamma-rich fraction of mixed picolines. The 0.679 part of filter cake is mixed with 0.374 part of water, heated to dissolve the crystals and then cooled to about 20° C. The mixture is centrifuged and the crystals recovered as before. The once recrystallized product, amounting to 0.55 part, is again mixed with 0.374 part of water, heated to dissolve the crystals, cooled and centrifuged as before. There is thus obtained 0.438 part of twice recrystallized complex compound of beta-picoline and zinc sulfate.

Beta-picoline is recovered from the 0.438 part of complex compound by mixing the latter with 0.596 part of water and adding 0.142 part of flake sodium hydroxide. The beta-picoline which forms a supernatant layer is separated from the mixture and distilled from 0.226 part of flake sodium hydroxide. The beta-picoline thus obtained amounts to 0.20 part by weight of the original mixture of beta and gamma-picolines and has a purity of 98 percent.

The mother liquor from the first recrystallization of the beta-picoline-zinc sulfate complex is made strongly alkaline by adding 0.142 part of flake sodium hydroxide and the supernatant layer of beta-picoline is separated and distilled from solid sodium hydroxide. There is thus obtained an additional 0.57 part of beta-picoline having a purity of 96 percent.

The filtrate from the second recrystallization of the beta-picoline-zinc sulfate complex is made alkaline by adding 0.142 part of flake sodium hydroxide and recovering beta-picoline as before. An additional 0.039 part of beta-picoline is thus obtained having a purity of 94 percent. The total yield of beta-picoline having a purity of 94 percent or better is 0.296 part or 64 percent of the beta-picoline contained in the starting material. The mother liquor obtained by filtering the original reaction mixture is treated with solid sodium hydroxide until the entire mixture is strongly alkaline. The mixture is cooled to approximately 20° C. and the supernatant layer of mixed picolines which forms is separated and distilled from solid sodium hydroxide. The distillate consists of 0.639 part by weight of gamma-rich fraction of mixed picolines containing approximately 70 percent by weight of gamma-picoline and about 30 percent of beta-picoline.

Although in the foregoing procedure the complex compound of beta-picoline and zinc sulfate is recrystallized after its separation from the reaction mixture, this recrystallization step is not essential, and beta-picoline of from 94 to 95 percent purity can be recovered directly from the separated and washed zinc sulfate complex.

Example 2B

One part by weight of the gamma-rich fraction of mixed picolines recovered in Example 2A is mixed with approximately 1.8 parts (1.0 molecular proportion) of phthalic acid and with slightly more than its weight of acetone. The entire mixture is warmed gently until a substantially homogeneous solution is obtained and then cooled slowly and with stirring to approximately 20° C. The thick slurry which results is centrifuged and washed in the centrifuge with 1.4 parts of acetone. The filtrate and washings are set aside for acetone recovery and the crystals obtained are recrystallized from 0.8 part of acetone. Upon centrifuging as before, the filtrate is set aside for acetone recovery and the crystals, amounting to 0.86 part and consisting of gamma-picoline phthalate, are mixed with 1.7 parts of water and the mixture made alkaline with flake sodium hydroxide. The supernatant layer of gamma-picoline which forms is separated and distilled over solid sodium hydroxide. There is thus obtained 0.384 part or a yield of 55.0 percent of the gamma-picoline of the original gamma-rich fraction. The purity of the gamma-picoline thus obtained is 95 percent.

The acetone filtrates obtained during the formation and recrystallization of the gamma-picoline phthalate are combined and acetone recovered therefrom by distillation. The residue is dissolved in a small amount of water, the mixture made alkaline with solid sodium hydroxide, and the supernatant layer of mixed picolines which forms is separated and distilled over solid sodium hydroxide. There is thus obtained 0.55 part of a mixture of recovered picolines containing somewhat more beta-picoline than gamma-picoline. The recovered mixture of picolines is subsequently included when making up a new batch of mixed picolines for separation as in Example 2A.

Although in Examples 1A and 2A the same starting picoline mixture was used, Example 1A is particularly adapted to the treatment of a mixture rich in gamma-picoline while Example 2A is particularly adapted to the treatment of a mixture rich in beta-picoline; both Examples 1B and 2B may be used for the treatment of picoline mixtures that have not been previously treated as in the respective examples from which each depends.

I claim:

1. The method of separating beta and gamma-picolines in purified form from a mixture thereof that is substantially free from lutidines, which includes: treating the mixture of beta and gamma-picolines with phthalic acid in acetone to form a hot concentrated acetone solution of mixed picoline phthalates; cooling the solution and separating therefrom crystalline gamma-picoline phthalate and a filtrate; recovering pure gamma-picoline from the separated crystalline gamma-picoline phthalate; recovering a beta-rich fraction of picolines from the filtrate; treating the beta-rich fraction of picolines with a concentrated aqueous zinc sulfate solution to form a hot concentrated aqueous solution of complex compounds of the picolines and zinc sulfate; cooling the solution and separating therefrom a crystalline complex compound of beta-picoline and zinc sulfate; and recovering beta-picoline from the separated crystalline complex compound.

2. The method of claim 1 wherein the hot concentrated aqueous solution of picoline-zinc sulfate complex compounds contains about 2 mols of picoline for each mol of zinc sulfate therein.

3. The method of claim 1 wherein the hot concentrated aqueous solution of picoline-zinc sulfate complex compounds contains from about 1.0 to about 1.5 parts by weight of water for each part of picoline therein.

4. The method of separating beta and gamma-picolines in purified form from a mixture that is substantially free from lutidines, which includes: treating the mixture of beta and gamma-picolines with phthalic acid in acetone to form a hot concentrated acetone solution of mixed picoline phthalates; cooling the solution and separating therefrom crystalline gamma-picoline phthalate and a filtrate; recovering pure gamma-picoline from the crystalline gamma-picoline phthalate; recovering acetone and a beta-rich fraction of picolines from the filtrate; treating the beta-rich fraction with a concentrated aqueous zinc sulfate solution to form a hot concentrated aqueous solution of complex compounds of the picolines and zinc sulfate; cooling the solution and separating therefrom a crystalline complex compound of beta-picoline and zinc sulfate and a filtrate; recovering pure beta-picoline from the crystalline complex compound of beta-picoline and zinc sulfate; recovering a fraction of mixed picolines from the filtrate from the beta-picoline-zinc sulfate complex compound; and returning the fraction of mixed picolines to the first of said steps.

5. The method of separating beta and gamma-picolines in purified form from a mixture thereof that is substantially free from lutidines, which includes: treating the mixture of beta and gamma-picolines with a concentrated aqueous zinc sulfate solution to form a hot concentrated aqueous solution of mixed complex compounds of the picolines and zinc sulfate; cooling the solution and separating therefrom a filtrate and a crystalline complex compound of beta-picoline and zinc sulfate; recovering beta-picoline in purified form from the separated crystalline complex compound of beta-picoline and zinc sulfate; recovering a gamma-rich fraction of picolines from the filtrate; treating the gamma-rich fraction with phthalic acid in acetone to form a hot concentrated acetone solution of mixed picoline phthalates; cooling the solution and separating therefrom a crystalline gamma-picoline phthalate; and recovering gamma-picoline in purified form from the separated crystalline gamma-picoline phthalate.

6. The method of claim 5 wherein the hot concentrated acetone solution of picoline phthalates contains approximately one mol of phthalic acid for each mol of picoline.

7. The method of separating beta and gamma-picolines in purified form from a mixture thereof that is substantially free from lutidines, which includes: treating the mixture of beta and gamma-picolines with a concentrated aqueous zinc sulfate solution to form a hot concentrated aqueous solution of mixed complex compounds of the picolines and zinc sulfate; cooling the solution and separating therefrom a filtrate and a crystalline complex compound of beta-picoline and zinc sulfate; recovering beta-picoline in purified form from the crystalline complex compound of beta-picoline and zinc sulfate; recovering a gamma-rich fraction of picolines from the filtrate; treating the gamma-rich fraction with phthalic acid in acetone to form a hot concentrated acetone solution of mixed picoline phthalates; cooling the hot concentrated acetone solution of picoline phthalates and separating therefrom an acetone filtrate and a crystalline gamma-picoline phthalate; recovering gamma-picoline in purified form from the separated crystalline gamma-picoline phthalate; recovering acetone and a fraction of mixed picolines from the acetone filtrate; and returning the fraction of mixed picolines to the first of said steps.

LOUIS J. CRACAS.

REFERENCES CITED

The following references are of record in the file of this patent:

UNITED STATES PATENTS

| Number | Name | Date |
| --- | --- | --- |
| 2,035,583 | Bailey | Mar. 31, 1936 |
| 2,259,896 | Lake | Oct. 21, 1941 |
| 2,336,502 | Reimers | Dec. 14, 1943 |
| 2,421,413 | Engel | June 3, 1947 |

OTHER REFERENCES

J. American Chem. Soc., 43, pp. 1936–1940 (1921).

Journal of Applied Chemistry, U. S. S. R., vol. 28 (1945), pp. 259–263.